United States Patent
Lee et al.

(10) Patent No.: US 8,789,510 B2
(45) Date of Patent: Jul. 29, 2014

(54) THROTTLE VALVE DEVICE INCLUDING CONTROL LOGIC OF THROTTLE VALVE FOR DIESEL VEHICLE AND THE CONTROL METHOD THEREOF

(75) Inventors: Heungseok Lee, Seoul (KR); Jaemin Jin, Hwaseong-si (KR); Sukil Oh, Suwon-si (KR); Dongchul Lee, Anyang-si (KR); Insoo Jung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 289 days.

(21) Appl. No.: 13/284,468

(22) Filed: Oct. 28, 2011

(65) Prior Publication Data

US 2012/0132175 A1  May 31, 2012

(30) Foreign Application Priority Data

Nov. 29, 2010 (KR) ........................ 10-2010-0120057

(51) Int. Cl.
*F02D 41/16* (2006.01)
*F02D 11/10* (2006.01)
*F02M 25/07* (2006.01)
*F02B 47/08* (2006.01)

(52) U.S. Cl.
USPC ............... 123/339.14; 123/399; 123/568.19; 701/103; 701/108; 701/110

(58) Field of Classification Search
USPC ................. 123/339.1, 339.14, 399, 568.19, 123/568.21; 701/103, 108, 110
See application file for complete search history.

(56) References Cited

U.S. PATENT DOCUMENTS 7,454,897 B2 * 11/2008 Mizuguchi ...................... 60/285
8,452,522 B2 *  5/2013 Gao et al. ........................ 701/110

FOREIGN PATENT DOCUMENTS

| JP | 58077132 A | 5/1983 |
| JP | 59005845 A | 1/1984 |
| JP | 62255544 A | 11/1987 |
| JP | 2001193538 A | 7/2001 |
| JP | 2002030979 A | 1/2002 |
| JP | 2003-193896 A | 7/2003 |
| JP | 2009-103132 A | 5/2009 |
| KR | 10-0521163 B1 | 10/2005 |
| KR | 1020070036231 A | 4/2007 |
| KR | 1020100058956 A | 6/2010 |

\* cited by examiner

*Primary Examiner* — Hai Huynh
(74) *Attorney, Agent, or Firm* — Morgan, Lewis & Bockius LLP

(57) ABSTRACT

A throttle valve device including a throttle valve control logic may include an electronic controller that determines whether a driving state of a vehicle is an idle-driving state from electronic signals supplied from sensors, a desired air amount map unit that is electrically connected with the electronic controller and where a desired amount of air according to RPM of an engine and an amount of injected fuel for idle-driving are set; and a governor for controlling an EGR valve and a governor for controlling a throttle valve that are electrically connected with the electronic controller and the desired air amount map unit and control the driving of the EGR valve and the throttle valve, respectively, such that the desired amount of air output in accordance with the RPM of the engine of the vehicle and an amount of the injected fuel is supplied to the engine in the idle-driving.

9 Claims, 2 Drawing Sheets

THROTTLE VALVE DEVICE INCLUDING CONTROL LOGIC OF THROTTLE VALVE FOR DIESEL VEHICLE AND THE CONTROL METHOD THEREOF

CROSS-REFERENCE TO RELATED APPLICATIONS

The present application claims priority to Korean Patent Application Number 10-2010-0120057 filed Nov. 29, 2010, the entire contents of which application is incorporated herein for all purposes by this reference.

BACKGROUND OF THE INVENTION

1. Field of the Invention

The present invention relates to a throttle valve device including a control logic of a throttle valve and a control method thereof, and more particularly, to a throttle device valve including a control logic of a throttle valve that can reduce exciting force by decreasing the maximum combustion pressure of a diesel engine and can reduce vibration and noise that are generated in idling of the diesel engine, by decreasing the amount of air supplied to the engine when the vehicle is driven in idling to a desired amount of air that dose not generate hesitation, and a control method of the throttle valve device.

2. Description of Related Art

In general, diesel engines implement high fuel efficiency and high torque in the practical use in comparison to gasoline engines, and the fuel and oil cost is relatively low.

The diesel engines are not largely different in the mechanical point of view from the gasoline engines, but are different in that the gasoline engines compress a gas mixture of air and fuel in a process of fuel combustion and then make ignition with an electric spark, while the diesel engine sucks only air and compresses it at high compression ratio (16-23:1) and then makes self-ignition by using high compression heat of 500 C.° or more.

In general, the amount of air is increased by opening the throttle valve with the acceleration pedal to increase the number of revolutions of the gasoline engines, but it is necessary to suck always a large amount of air for the diesel engines, such that a method of increasing the amount of injected fuel by pressing down the acceleration pedal without controlling the throttle valve to increase the number of revolutions has been used.

Further, in the diesel engines, the particles of the air sucked in to the cylinder slowly moves before compressed and hit against and interfere with each other when compressed, such that the motion speed of the particles increase and the temperature of the air correspondingly increases. As described above, the larger the amount of intake air or the higher the compression ratio, the larger the compression heat of the air correspondingly becomes.

However, the diesel engine has a defect that large vibration and high noise is caused by the compression ignition type. Recently, although the diesel engines are increasingly used for improvement in performance and soundproof technology, the noise and vibration, particularly, the noise and vibration in the idle state reduces the entire commercial value of the vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a throttle valve device including a throttle valve control logic that can reduce exciting force by decreasing the maximum combustion pressure of a diesel engine and can reduce vibration and noise that are generated in idling of the diesel engine, by decreasing the amount of air supplied to the engine when the vehicle is driven in idling to a desired amount of air that dose not generate hesitation, and a control method of the throttle valve device.

Further, various aspects of the present invention are directed to providing a throttle valve device including a throttle valve control logic that can more effectively control the amount of air in the engine in accordance with the amount of injected air and the RPM of the engine, by controlling the amount of air supplied into the cylinder of the engine to a desired amount of air that dose not case hesitation in idling of a vehicle in accordance with the amount of injected air and the RPM of the engine, and can effectively reduce the vibration and noise.

In an aspect of, the method of controlling a throttle valve of a diesel vehicle may include determining idle enter conditions in which an acceleration pedal is not pressed and a vehicle speed is 0, and controlling the amount of air supplied into cylinders of an engine by controlling an EGR (Exhaust Gas Recirculation) valve and a throttle valve such that the amount of air supplied into the cylinders of the engine become a desired amount of air, through a predetermined air amount map unit that stores the desired amount of air corresponding to the number of revolutions of the engine and the amount of injected fuel, when the vehicle enters an idle mode in which the acceleration pedal is not pressed down and the vehicle speed is 0.

The idle enter conditions further include a state in which the number of revolutions of the engine is a reference RPM or less.

In the controlling the amount of air, when the EGR valve is an open loop type and the throttle valve is a close loop type, the EGR valve is closed and the throttle valve is controlled such that the amount of air supplied into the cylinders through the throttle valve follows the desired amount of air.

When the EGR valve is a close loop type and the throttle valve is an open loop type, the degree of opening of the throttle valve is kept at a constant degree of opening such that the amount of air in the cylinders becomes the desired amount of air by an EGR gas supplied into the cylinders through the EGR valve.

In the determining of the idle enter conditions, whether all of the number of revolutions of the engine, the temperature of an external air, the temperature of a cooling water, the pressure of the external air, the stage of a gear, and/or the brake satisfy the idle enter conditions is determined.

The method may further include a normal traveling mode in which an electronic controller sets a driving mode of the vehicle into a normal traveling mode such that the degree of opening of the throttle valve become 100%, when a driver presses down the acceleration pedal for traveling, after the controlling the amount of air or when the idle enter conditions are not satisfied.

In another aspect of the present invention, the throttle valve device including a throttle valve control logic, may have an electronic controller that determines whether a driving state of a vehicle is an idle-driving state from electronic signals supplied from sensors in the vehicle, a desired air amount map unit that is electrically connected with the electronic controller and where a desired amount of air according to RPM of an engine and an amount of injected fuel for idle-driving are set, and a governor for controlling an EGR valve and a governor for controlling a throttle valve that are electrically connected with the electronic controller and the desired air amount map unit and control the driving of the EGR valve and the throttle valve, respectively, such that the desired amount of air output in accordance with the RPM of the engine of the vehicle and an amount of the injected fuel is supplied to the engine in the idle-driving.

The driving state of the vehicle is determined to be the idle-driving state when an acceleration pedal is not pressed and a vehicle speed is 0.

The idle-driving state further include a state in which the number of revolutions of the engine is a reference RPM or less.

When the EGR valve is controlled in an open loop type and the throttle valve is controlled in a close loop type, the governor for controlling the EGR valve closes the EGR valve and the governor for controlling the throttle valve controls the driving of the throttle valve such that the amount of air supplied into a cylinder becomes the desired amount of air.

When the EGR valve is controlled in a close loop type and the throttle valve is controlled in an open loop type, the governor for controlling the throttle valve controls the throttle valve such that the degree of opening is kept at a constant degree of opening and the governor for controlling the EGR valve makes the amount of air in a cylinder follow the desired amount of air by an EGR gas supplied into the cylinder through the EGR valve.

The method may further include a normal traveling mode in which an electronic controller sets a driving mode of the vehicle into a normal traveling mode such that the degree of opening of the throttle valve become 100%, when a driver presses down the acceleration pedal for traveling, after the controlling the amount of air.

Another exemplary embodiment of the present invention provides a throttle valve device including a throttle valve control logic, including: an electronic controller that determines whether the driving state of a vehicle is an idle-driving sate from electronic signals supplied from sensors in the vehicle; a desired air amount map unit that is electrically connected with the electronic controller and where a desired amount of air according to RPM of an engine and the amount of injected fuel for idle-driving is set; and a governor for controlling an EGR valve and a governor for controlling a throttle valve that are electrically connected with the electronic controller and the desired air amount map unit and control the driving of an EGR valve and a throttle valve, respectively, such that the desired amount of air output in accordance with the RPM of the engine of a vehicle and the amount of injected air is supplied to the engine in idle-driving.

When the EGR valve is controlled in an open loop type and the throttle valve is controlled in a close loop type, the governor for controlling an EGR valve may close the EGR valve and the governor for controlling a throttle valve may control the driving of the throttle valve such that the amount of air supplied into the cylinder becomes the desired amount of air.

When the EGR valve is controlled in a close loop type and the throttle valve is controlled in an open loop type, the governor for controlling the throttle valve may control the throttle valve such that the degree of opening is kept at a constant degree of opening and the governor for controlling the EGR valve may make the amount of air in the cylinder follow the desired amount of air by an EGR gas supplied into the cylinder through the EGR valve.

The throttle valve device including a throttle valve control logic and the control method of the present invention can reduce vibration and noise that are generated in idle-driving of a diesel engine by reducing the exciting force by decreasing the maximum fuel pressure of the diesel engine, by controlling the amount of air supplied to the engine to the desired amount of air that does not cause hesitation, when the vehicle is in idle-driving.

Since the throttle valve device including a throttle valve control logic that can more effectively control the amount of air in the engine in accordance with the amount of injected air and the RPM of the engine, by controlling the amount of air supplied into the cylinder of the engine to a desired amount of air that dose not case hesitation in idling of a vehicle in accordance with the amount of injected fuel and the RPM of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
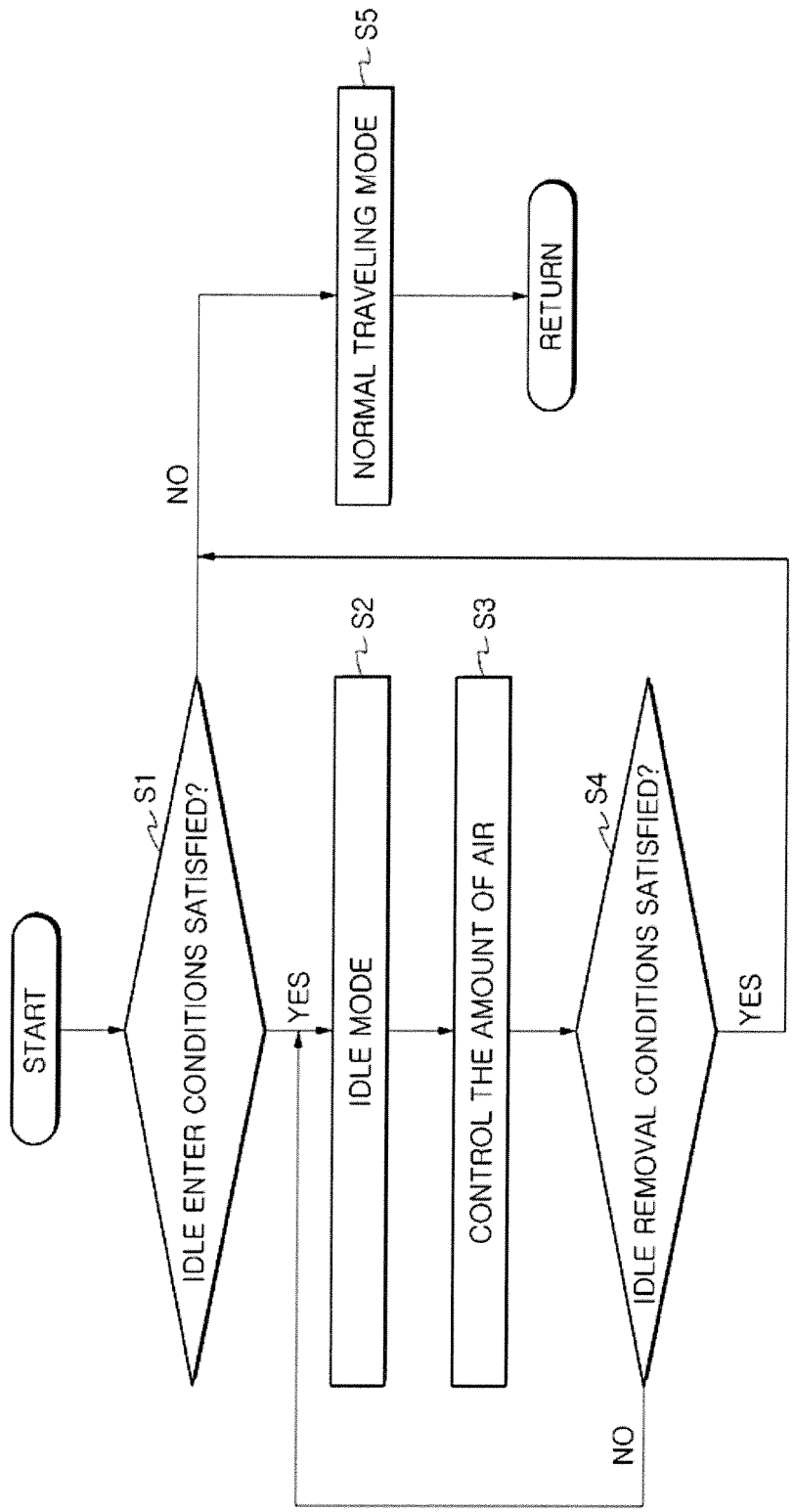
FIG. 1 is a flowchart illustrating a method of controlling a throttle valve of a diesel vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter with reference to the accompanying drawings, for those skilled in the art to easily implement the present invention. Similar configurations and operations are given the same reference numerals throughout the specification.

Figure 2:
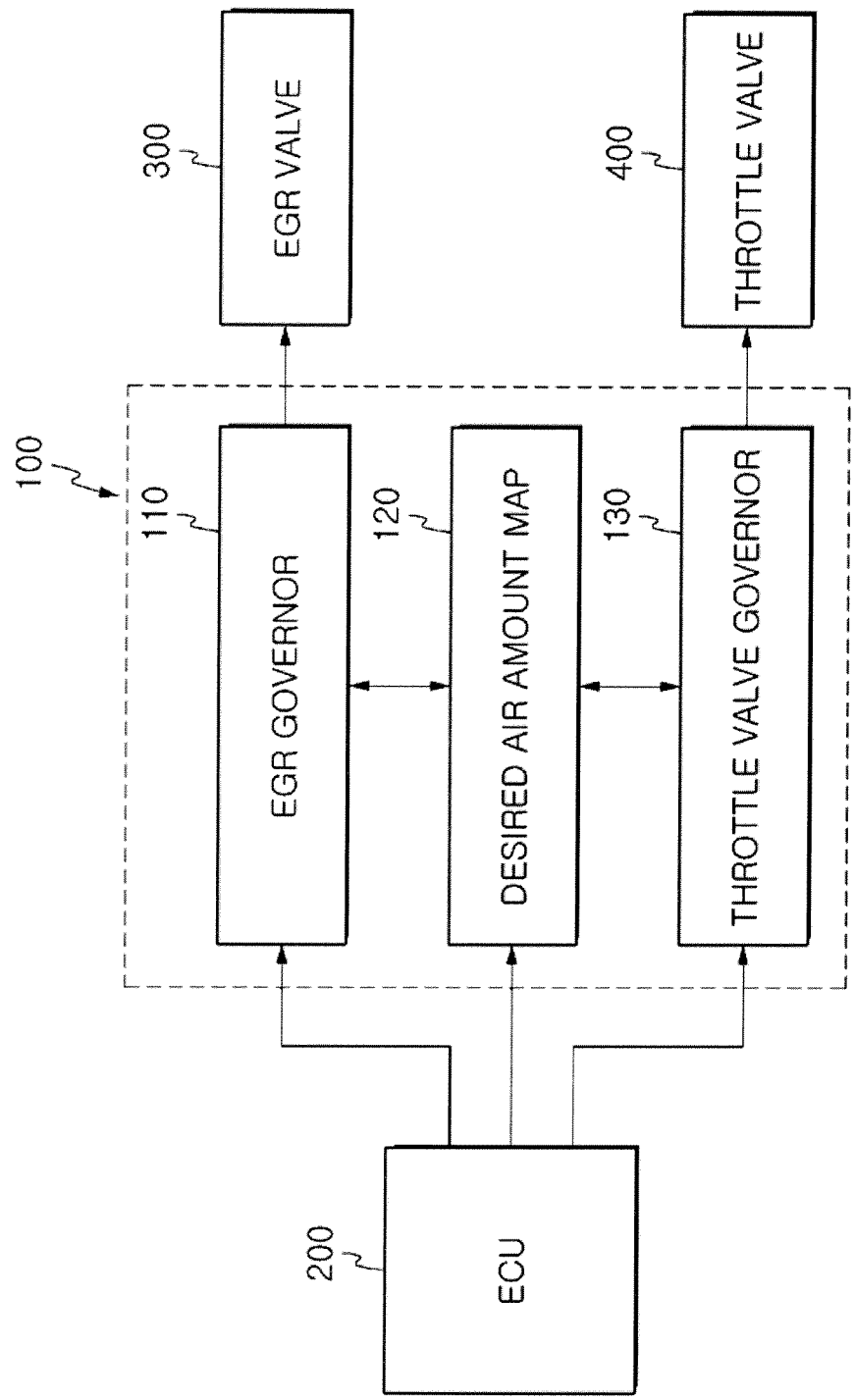
FIG. 2 is a block diagram of a throttle valve device including a throttle valve control logic for performing the method of controlling a throttle valve of a diesel vehicle of FIG. 1.

Referring to FIGS. 1 and 2, throttle valve device including a throttle valve control logic includes an idle driving controller 100 and an electronic controller 200. Idle driving controller 100 is electrically connected with electronic controller 200 that determines the driving state of the vehicle from an electronic signal supplied from sensors in the vehicle, and is driven when electronic controller 200 determines that the vehicle is in an idle mode.

Idle driving controller 100 includes a governor 110 for controlling an EGR valve that controls the driving of an EGR valve, a desired air amount map unit 120 where a desired amount of air is set in accordance with the RPM of the engine and the amount of injected fuel in idling driving is set, and a governor 130 for controlling a throttle valve that controls the driving of a throttle valve. Further, governor 110 for controlling an EGR valve and governor 130 for controlling a throttle valve controls driving of the EGR valve and the throttle valve, respectively, such that the amount of air supplied into the engine corresponds to the desired amount of air.

Desired air amount map unit 120 may be set at a desired amount of air above the minimum amount of air that does not cause hesitation in the engine in accordance with the RPM of the engine and the amount of injected fuel such that reduce the vibration noise of the engine which is generated in compressing.

In order for this control, electronic controller 200 performs an determining idle enter condition (S1) in which it is determined that the vehicle can enter the idle mode, when the vehicle speed is 0, the acceleration pedal is not pressed down, and the number of revolutions of the engine is a reference RPM or less, in order to ascertain that the vehicle enters the idle mode. The reference RPM may be set a little higher in comparison to the actual driving RPM valve, when the engine is in idle state, to prevent an error.

In the determining an idle enter condition (S1), the temperature of the external air, the temperature of the cooling water, and the pressure of the external air are checked to determine whether the external environment conditions satisfy the conditions for controlling into the idle mode. The checking of the external environmental conditions is to ascertain whether the temperature of the external air, the temperature of the cooling water, and the pressure of the external air are included in a reference range of the vehicle for normally driving the vehicle.

In the determining an idle enter condition (S1), it is ascertained whether the stage of the gear, and/or the brake satisfy the idle enter conditions, in order to remove side effects due to starting delay and rapid change in the degree of opening of the valves, which may be generated in the control of the throttle valve and the EGR valve.

In the determining the idle enter condition (S1), when it is determined that the vehicle can enter the idle mode, a controlling the amount of air which controls EGR valve 300 and throttle valve 400 such that the amount of air supplied to the cylinders of the engine become the desired amount of air, through desired air amount map unit 120, in order to drive the vehicle in the idle mode (S2).

In the controlling the amount of air (S3), the amount of air supplied to the cylinders of the engine are controlled to be the desired amount of air through governor 110 for controlling an EGR valve that control EGR valve 300 and governor 130 for controlling a throttle valve that controls throttle valve 400.

In the exemplary embodiment, assuming that EGR valve 300 is controlled in a close loop type and throttle valve 400 is controlled in an open loop type, governor 130 for controlling a throttle valve keeps the degree of opening of throttle valve 400 at a constant degree of opening and governor 110 for controlling an EGR valve controls the amount of air in the cylinder to be the desired amount of air by an EGR gas supplied into the cylinder through EGR valve 300. The amount of opening of throttle valve 400 is set a little higher than the set desired amount of air such that the EGR gas supplied into the cylinder through EGR valve 300 can follow the desired amount of air.

Assuming that EGR valve 300 is controlled in an open loop type and throttle valve 400 is controlled in a close loop type, governor 110 for controlling an EGR valve controls EGR valve 300 to be closed and governor 130 for controlling a throttle valve controls the driving of throttle valve 400 such that the amount of air supplied into the cylinder follows the desired amount of air of the desired air amount map unit 120.

In the controlling the amount of air (S3), since shock may be generated when the amount of air supplied to the cylinders of the engine is rapidly changed to the desired amount of air, the amount of air is changed to the desired amount of air corresponding to desired air amount map unit 120 by slowly controlling the driving of EGR valve 300 and throttle valve 400 through a lamp function provided for governor 110 for controlling an EGR valve and governor 130 for controlling a throttle valve.

An determining an idle removal condition (S4) which ascertains whether the driver presses down the acceleration pedal for traveling is performed after the controlling the amount of air (S3), and when the driver presses down the acceleration pedal for traveling, a normal driving mode (S5) in which the electronic controller sets the driving mode of the vehicle into a normal driving mode such that the amount of opening of throttle valve 400 becomes 100% is performed.

The throttle valve device including a throttle valve control logic and the control method thereof can reduce vibration and noise that are generated in idle-driving of a diesel engine by reducing the exciting force by decreasing the maximum combustion pressure of the diesel engine, by controlling the amount of air supplied to the cylinder of the engine to the desired amount of air that does not cause hesitation, when the vehicle is in idle-driving.

Since the throttle valve device including a throttle valve control logic and the control method that can more effectively control the amount of air in the engine in accordance with the amount of injected air and the RPM of the engine, by controlling the amount of air supplied into the cylinder of the engine to a desired amount of air that dose not case hesitation in idling of a vehicle in accordance with the RPM of the engine and the amount of injected fuel, it is possible to effectively reduce the maximum combustion pressure of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A method of controlling a throttle valve of a diesel vehicle, comprising:
   determining idle enter conditions in which an acceleration pedal is not pressed and a vehicle speed is 0; and
   controlling an amount of air supplied into cylinders of an engine by controlling an EGR (Exhaust Gas Recirculation) valve and a throttle valve such that the amount of air supplied into the cylinders of the engine becomes a desired amount of air, through a predetermined air amount map unit that stores the desired amount of air corresponding to the number of revolutions of the engine and an amount of injected fuel, when the vehicle enters an idle mode in which the acceleration pedal is not pressed down and the vehicle speed is 0;

wherein in the controlling the amount of air, when the EGR valve is an open loop type and the throttle valve is a close loop type, the EGR valve is closed and the throttle valve is controlled such that the amount of air supplied into the cylinders through the throttle valve follows the desired amount of air.

2. The method as defined in claim 1, wherein the idle enter conditions further include a state in which the number of revolutions of the engine is a reference RPM or less.

3. The method as defined in claim 1, wherein when the EGR valve is a close loop type and the throttle valve is an open loop type, the degree of opening of the throttle valve is kept at a constant degree of opening such that the amount of air in the cylinders becomes the desired amount of air by an EGR gas supplied into the cylinders through the EGR valve.

4. The method as defined in claim 1, wherein in the determining of the idle enter conditions, whether all of the number of revolutions of the engine, the temperature of an external air, the temperature of a cooling water, the pressure of the external air, the stage of a gear, and/or the brake satisfy the idle enter conditions is determined.

5. The method as defined in claim 1, further comprising a normal traveling mode in which an electronic controller sets a driving mode of the vehicle into a normal traveling mode such that the degree of opening of the throttle valve become 100%, when a driver presses down the acceleration pedal for traveling, after the controlling the amount of air or when the idle enter conditions are not satisfied.

6. A throttle valve device including a throttle valve control logic, comprising:

an electronic controller that determines whether a driving state of a vehicle is an idle-driving state from electronic signals supplied from sensors in the vehicle;

a desired air amount map unit that is electrically connected with the electronic controller and where a desired amount of air according to RPM of an engine and an amount of injected fuel for idle-driving is set; and a governor for controlling an EGR valve and a governor for controlling a throttle valve that are electrically connected with the electronic controller and the desired air amount map unit and control the driving of the EGR valve and the throttle valve, respectively, such that the desired amount of air output in accordance with the RPM of the engine of the vehicle and the amount of the injected fuel is supplied to the engine in the idle-driving;

wherein when the EGR valve is controlled in an open loop type and the throttle valve is controlled in a close loop type, the governor for controlling the EGR valve closes the EGR valve and the governor for controlling the throttle valve controls the driving of the throttle valve such that the amount of air supplied into a cylinder becomes the desired amount of air.

7. The device as defined in claim 6, wherein the driving state of the vehicle is determined to be the idle-driving state when an acceleration pedal is not pressed and a vehicle speed is 0.

8. The method as defined in claim 7, wherein the idle-driving state further include a state in which the number of revolutions of the engine is a reference RPM or less.

9. The device as defined in claim 6, wherein the EGR valve is controlled in a close loop type and the throttle valve is controlled in an open loop type, the governor for controlling the throttle valve controls the throttle valve such that the degree of opening is kept at a constant degree of opening and the governor for controlling the EGR valve makes the amount of air in a cylinder follow the desired amount of air by an EGR gas supplied into the cylinder through the EGR valve.

\* \* \* \* \*